3,469,938
PRODUCTION OF HYDRATED SODIUM TRIPOLYPHOSPHATE

James E. McLeod, Elizabeth, and Steve Taborosi, Woodbridge, N.J., Harvey F. Groening, Lawrence, Kans., and Harold D. Riechers, Ponca City, Okla., assignors to FMC Corporation, New York, N.Y., a corporation of Delaware
No Drawing. Filed July 28, 1967, Ser. No. 656,707
Int. Cl. C01b 25/30; C11d 7/16
U.S. Cl. 23—107                     3 Claims

ABSTRACT OF THE DISCLOSURE

This specification discloses a method of producing hydrated sodium tripolyphosphate, preferably to the point just short of theoretical hydration to produce the hexahydrate, in controlled particle size and bulk density, by a process which involves grinding the anhydrous feed to a controlled extent, followed by hydration and screening.

BACKGROUND OF THE INVENTION

Field of the invention
Description of the prior art

This invention is concerned with the production of hydrated sodium tripolyphosphate of controlled particle size and bulk density, in a form such that it can be readily used in the preparation of mixed formulations containing sodium tripolyphosphate and other ingredients such as surfactants, bleaching materials, optical brighteners, extenders, and the like, all of which are commonly used in the manufacture of laundering, detergent, and bleaching compositions.

In the manufacture of such compositions, it is often desired to use sodium tripolyphosphate in the hydrated form, rather than in the dehydrated form in which it is customarily made from phosphoric acid and a source of sodium oxide. The anhydrous material is made by drying an aqueous solution containing dissolved sodium oxide and phosphorus oxide values in the desired ratio, either by spray drying to produce hollow spheres of rather low bulk density, or by conventional drying techniques to produce masses of rather high density, which are ground to the desired particle size range.

The principal problem in producing hydrated sodium tripolyphosphate in desirable form from the anhydrous product and water is that it is difficult to get uniform hydration, so that the product contains free water which must be removed, and tends to be lumpy. Moreover, the hydration reaction is exothermic, so that if care is not taken, the sodium tripolyphosphate may heat up locally above its conversion point, and off grade material obtained.

Two methods have been suggested for overcoming these problems. One, suggested in U.S. Patent 3,046,092, hydrates with ice, while stirring the product, thereby keeping the temperature low, and the hydration relatively uniform. The product is reported to have the same particle size distribution before and after the hydration, except for the abrasion due to the mixing operation. The bulk density is the same before and after hydration.

A second method is suggested in French Patent 1,437,965, délivré Mar. 28, 1966. This disclosure suggests hydration with about 10 to 25% excess water over theoretical, while simultaneously stirring and passing a current of warm air through the material, using the evaporation of the water to draw off the heat developed by the hydration. A second drier is generally used to finish the drying. As in the case of the first technique, bulk density is the same before and after treatment. However, it is necessary to screen out a small percentage of larger size particles formed during the operation.

In both these techniques, the anhydrous feed to the process is material already treated to be of the desired bulk density and particle size; the necessary breakdown of particle size by attrition, or the increase caused by hydration, call for additional screening and reworking.

The most desirable bulk density and particle size range of sodium tripolyphosphate is dependent on the formulation in which it is to be used; the physical form should approximate that of the finished formulation. Hence it would be highly desirable to produce hydrates of controlled particle size and bulk density from a single raw material, most economically from anhydrous feed direct from a drier.

SUMMARY OF THE INVENTION

We have found that it is indeed possible to produce such products by a process which involves using anhydrous sodium tripolyphosphate containing at least about 10% by weight below 100 mesh (U.S. Standard), as feed from the hydration process, hydrating the anhydrous material with no more than 5% above the theoretical amount necessary to produce the hexahydrate, and preferably with less water than theoretical, while distributing the water uniformly over the tripolyphosphate while it is being agitated at such a rate that the temperature is kept below about 80° C., to produce an agglomerated product of lower bulk density than the original material, then preferably drying the resultant product at a temperature below about 80° C., to insure against decomposition, grinding the resultant product to produce a mixture of fines and the product of the desired particle size range (generally between —20 and +60 mesh), separating granules of the desired particle size range as product, and preferably returning the fines to the process.

The function of the fines in the process is to produce a cement with the water used to hydrate the product, which ties the particles together more loosely than the granules of the original anhydrous material and thus produce material of a lower bulk density.

DESCRIPTION OF THE INVENTION AND THE PREFERRED EMBODIMENTS

Sodium tripolyphosphate is generally made by drying an aqueous solution containing phosphoric acid and soda ash in which the molar ratio of Na/P is about 1:67. The solution is dried, and the dried material calcined to produce an anhydrous material which is generally present in two different phases, depending on the drying and calcining conditions and which are known as Phase I and Phase II. The resulting material when sold as anhydrous material is generally ground to the desired particle size, has a pH of about 9.9 in aqueous solution, and a bulk density of about 0.90 to 0.95.

As pointed out above, this material can be hydrated to hexahydrate by the controlled addition of enough water to give a product containing 22.7% water (theoretical for the hexahydrate). This requires about 30% of water based on the original anhydrous sodium tripolyphosphate.

We have found that the bulk density of the hydrate can be controlled by varying the particle size distribution of the feed, the amount of Phase I material in the feed, and the amount of water added to the product. The bulk density is lowered by increasing the amount of —100 mesh material being fed to the hydrator (including recycle fines), by increasing the Phase I content of the feed, and by increasing the percentage of hydration; it is increased by substantial amounts of oversize feed. In producing product in a preferred particle size range of −20 to +60 U.S. Standard mesh, we have been able to produce bulk densities over the entire range of 0.65 to .90, with a starting anhydrous material of 0.90 to 0.95 bulk density in the same particle size range.

In all of our work, the anhydrous sodium tripolyphosphate was prepared in conventional fashion in the plant from an aqueous solution of phosphoric acid, soda ash, and water, using a molar ratio of Na/P of 1.67. The solution was dried, and the dried material calcined to the anhydrous stage. The resultant lumpy product was ground to produce a mixture of granules and powder containing at least 10% of −100 mesh material and generally substantially more than this.

The dry ground material was then fed into a rotary hydrator in which the desired amount of water was sprayed onto the product. In general, we found it desirable to use less water than the theoretical amount needed to produce hexahydrate, although we have used up to a few percent over theoretical. With the theoretical amount of water or less, a completely hydrated product is not produced, and we find this to be most desirable, in that unexpectedly a product which has from about 2 to 20 less bound water than theoretical for the hexahydrate actually is more stable on storage than a fully hydrated material, when used in formulations. The use of these smaller amounts of water additionally permits the process to be run more readily, since less free water is left in the product before drying. In fact, for uses where a small amount of free water is unobjectionable, the drying step may be omitted from the process, since in such event the small amount of free water (generally between 1 and 2%) can be tolerated.

During the hydration step in the rotary hydrator the fines pick up the water faster than the coarser material and cause agglomeration of the particles, despite the rotary action which tends to break them up. The result is that the product leaves the hydrator with a larger particle size distribution than when it enters the hydrator.

This agglomerated material is then fed to a dryer where the small amount of free water present therein (generally under 2%) is removed by warm air. It is only necessary in this dryer to keep the temperature of the material low enough so that the tripolyphosphate is not dehydrated to another form of polyphosphate. This can be accomplished by keeping the temperature of the product below 80° C., and this is easy to do since there is very little water to remove. We have found that this can be accomplished by showering the material through a stream of warm air in a rotary dryer, using an air inlet temperature of the order of 80–85° C. Any other means of drying the product can be used, provided the temperature is not raised above the decomposition point of the tripolyphosphate, i.e. about 80° C. The product delivered from the dryer generally contains some oversize material, and is ground and screened, the desired particle size fraction being collected as product, the fines being recycled to the first stage feed.

The result is a product which is essentially in the desired particle size range, which has a pH (about 9.9) in solution corresponding with that of the anhydrous material, which is essentially free of uncombined water and contains from about 80% to 100% of the water necessary to complete hydration of the hexahydrate (22.7%), and preferably from 80 to 98% of theoretical, and has a controlled bulk density lower than that of the anhydrous starting material.

EXAMPLES OF THE INVENTION

The following are typical examples of the invention as practiced by us, and are given not by way of limitation but merely as descriptive of the invention.

Example 1.—Pilot production of material containing a small amount of free water

Phosphoric acid, soda ash, and water were reacted in sufficient quantity to give a sodium phosphate solution having a molar ratio of Na/P of 1.67 and a density of 55° Bé. at 90° C. The solution was dried and calcined to anhydrous sodium tripolyphosphate having a Phase I content of 21.6% in a plant rotary dryer. The resulting material was ground in a roller mill and samples were taken. The material contained 22% +20 and 19% −100 U.S. Standard mesh, and had a pH of 9.9 and a Loss on Ignition of less than 0.1% at 500° C.

Part of the sample was fed by a variable speed screw to a sixteenth-inch diameter by eleven-foot long rotary tube with an inlet dam 3¾ inches deep, a discharge dam 2¾ inches deep, and a slope of 0.214 inch/foot. The unit rotated at 26 r.p.m. and had no flights. The material entered the unit at a rate of 5.7 pounds/minute and a temperature of 34° C. Water was added at a rate of 750 gms./minute through a four-foot long, ½-inch diameter pipe with fourteen $\frac{1}{16}$-inch holes drilled in it. The pipe was positioned so as to keep the jets at the deepest part of the bed.

The agglomerated material discharged from the unit at 58° C. and was caught in small containers. The material was cooled, ground, and screened to give granules with a particle size distribution of 1% +20, 35% +30, 85% +60, and 1.2% −100 U.S. Standard mesh. This product has a Solvay bulk density of 0.72 gm./cc., a pH of 9.9, and a Loss on Ignition at 500° C. of 21.1% (including 1.5% free moisture).

Example 2.—Pilot production of material containing no free water

A material similar to that in Example 1 except that it contained 3.2% Phase I, 29% +20, and 14% −100 U.S. Standard mesh, had a 9.9 pH and 0.2 wt. percent Loss on Ignition at 500° C., was fed by a vibrating screw conveyor to the rotary tube described in Example 1, operating at the same slope and speed as in Example 1. The material entered the unit at 10.6 pounds/minute and a temperature of 26° C. Water was added through the same pipe at a rate of 1210 gms./minute.

The agglomerated material left the tube at a temperature of 65° C. and was allowed to cool. It was then dried with a stream of warm air heated to 75° C. The product was cooled, ground, and screened to give a granular material having 0.5% +20, 42% +30, 96% +60, and 0.4% −100 U.S. Standard mesh. This product has a bulk density of 0.81 gms./cc., a pH of 9.9, and a Loss on Ignition at 500° C. of 19.2%.

Example 3

The feed material was essentially the same as that of Examples 1 and 2, and consisted of rather coarse particles of anhydrous material. It was first partially granulated in a hammer mill, and then fed to a roller mill using the adjustment of the roller gap to control the particle size. The resultant ground material of the particle size shown in Table 1 below was fed to a rotary hydrator, where water was added by spraying onto the rotating bed of material. The hydrated material was discharged directly into a rotary dryer where the small amount of free water was removed by showering the material through a stream of warm air. The material was transferred directly to a screen where the granular product of the desired particle size range was separated from the oversize material and the fines. The oversize material was recycled through a hammer mill and then back to the screen, and the undersize was recycled back to the hydrator.

Table 1

Operating conditions:
- Feed rate _____lbs./hr__ 1,800
- Granular production rate _____lbs./hr__ 1,800
- STPP hexahydrate lost to dust collector lbs./hr__ 450
- Recycled undersize to hydrator ___lbs./hr__ 1,100
- Water flow rates to hydrator _____g.p.m__ 0.96
- To scrubber _____g.p.m__ 4.0
- Air flow rate _____ACFM__ 2,000

Temperatures, ° C.:
- Hydrator material inlet _____ 48
- Hydrator material outlet _____ 59
- Dryer material outlet _____ 45
- Dryer air inlet _____ 81
- Product _____ 39

Screen analysis of feed material (U.S. Standard):
- +10 mesh _____ 4.7
- +20 mesh _____ 32.2
- +30 mesh _____ 43.8
- +60 mesh _____ 61.6
- −100 mesh _____ 30.8
- −140 mesh _____ 27.1

Product analyses:
- Unbound moisture _____g./cc__ 0.56
- Total moisture _____g./cc__ 18.3
- Bulk density _____g./cc__ 0.72
- Screen analysis (U.S. Standard):
  - +10 mesh _____ 0.0
  - +20 mesh _____ 2.0
  - +30 mesh _____ 34.4
  - +60 mesh _____ 97.9
  - −100 mesh _____ 0.4
  - −140 mesh _____ 0.3

Obviously the examples can be multiplied indefinitely without departing from the scope of the invention as defined in the claims.

What is claimed is:

1. The method of producing hydrated granular sodium tripolyphosphate of controlled bulk density of from about 0.65 to 0.90 g./cc., which comprises hydrating anhydrous sodium tripolyphosphate feed material having a bulk density of about 0.90 to about 0.95 g./cc. and containing at least 10% by weight of hydrated sodium tripolyphosphate having a particle size below 100 mesh (U.S. Standard), with not in excess of 105% of the theoretical quantity of water necessary to produce the hexahydrate, distributing the water uniformly over said feed material by agitation of said material and at such a rate as to keep the temperature below 80° C. to produce a hydrated material agglomerated by the action of the water, grinding the coarse hydrated sodium tripolyphosphate material, separating a particle size range of about −20 to +60 mesh (U.S. Standard) as product, recycling remaining hydrated sodium tripolyphosphate fines having a particle size below about 100 mesh to the feed material and decreasing the bulk density of the product within the range of 0.65 g./cc. to 0.90 g./cc. by increasing the proportion of recycle fines in the feed material.

2. The method of claim 1 in which a product free of uncombined moisture is made by drying the hydrated material before screening, while maintaining it at an elevated temperature not in excess of 80° C.

3. The method of claim 2 in which the product is hydrated to a point between 80 and 98% of theoretical for hexahydrate.

References Cited

UNITED STATES PATENTS 3,046,092  7/1962  Montague _____ 23—106

FOREIGN PATENTS 1,437,965  1966  France.

OSCAR R. VERTIZ, Primary Examiner

HOKE S. MILLER, Assistant Examiner